United States Patent [19]

Schramm, deceased et al.

[11] 3,966,854
[45] June 29, 1976

[54] AIR TRAP

[75] Inventors: Harold J. Schramm, deceased, late of West Chester, Pa., by Florence J. Schramm, executrix; John R. McCullough; Joseph P. Yarnall, both of West Chester, Pa.

[73] Assignee: Schramm, Inc., West Chester, Pa.

[22] Filed: July 19, 1974

[21] Appl. No.: 490,211

Related U.S. Application Data

[62] Division of Ser. No. 286,008, Sept. 5, 1972, Pat. No. 3,848,623.

[52] U.S. Cl. .............................. 261/64 R; 261/124
[51] Int. Cl.² ...................... C02C 5/04; C02C 1/12
[58] Field of Search .............. 261/124, 121 R, 64 R, 261/65; 239/568; 137/185, 186, 404

[56] References Cited
UNITED STATES PATENTS

| 630,090 | 8/1899 | Nasmith | 137/186 |
|---|---|---|---|
| 2,586,143 | 2/1952 | Baker et al. | 137/185 |
| 2,637,335 | 5/1953 | Goff | 137/185 |
| 3,114,383 | 12/1963 | Myers | 137/185 |
| 3,242,072 | 3/1966 | Walker | 261/124 |
| 3,782,701 | 1/1974 | Hunt | 261/121 R |
| 3,782,704 | 1/1974 | Schramm et al. | 261/124 |

Primary Examiner—Tim R. Miles
Assistant Examiner—Gregory N. Clements
Attorney, Agent, or Firm—Smith, Harding, Earley & Follmer

[57] ABSTRACT

An air trap for removing accumulated water from a system for producing air bubbles in which the elongated conductor which has air supplied thereto from the compressor and which has openings through which air passes to produce the bubbles has an air trap connected thereto so that water therein can be forced readily therefrom by way of the air trap upon the introduction of air into the conductor. The air trap is moved to a closed position when the air has displaced the water from the conductor and is opened automatically when the supply of air is shut off.

5 Claims, 6 Drawing Figures

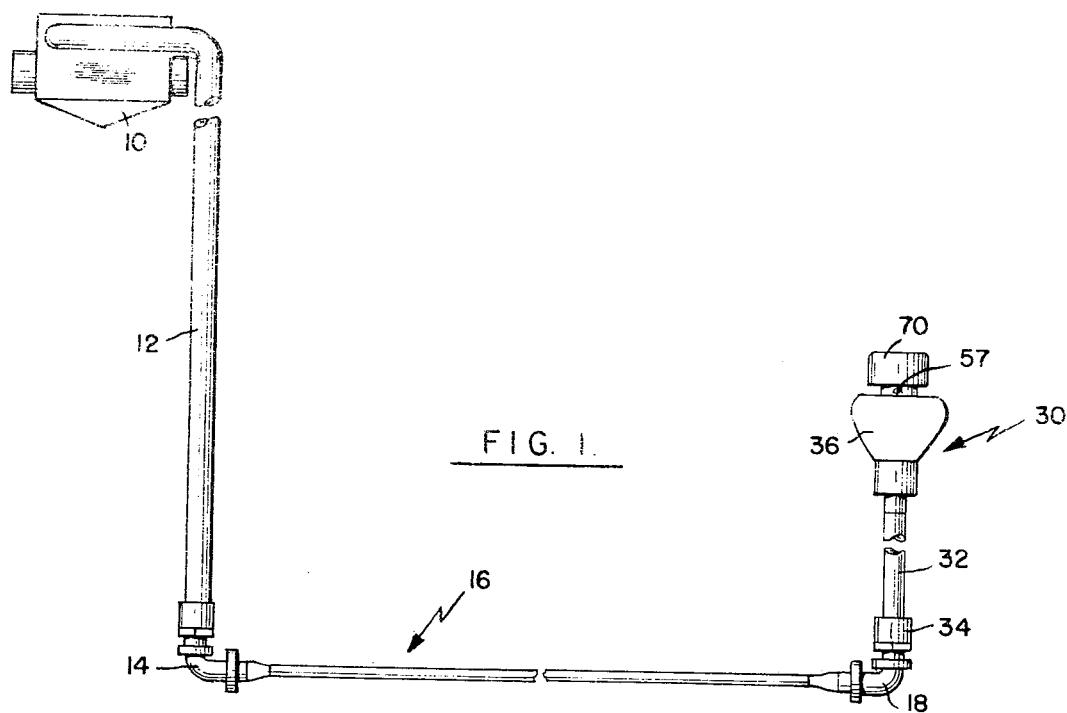
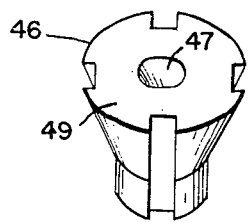
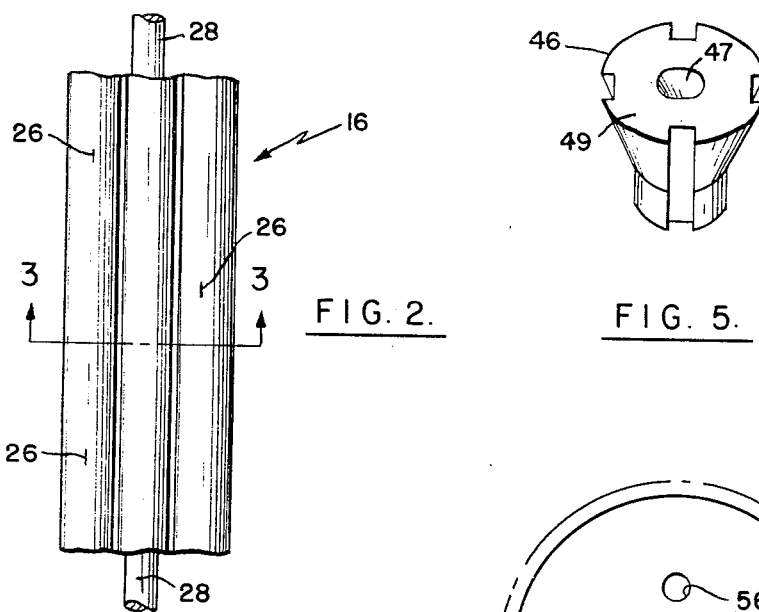
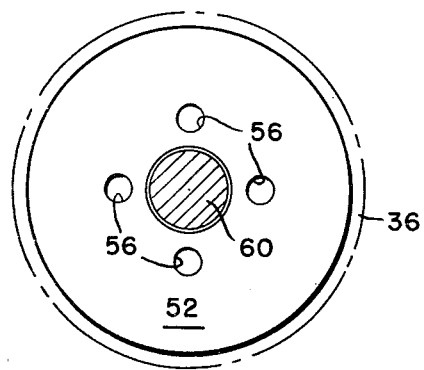
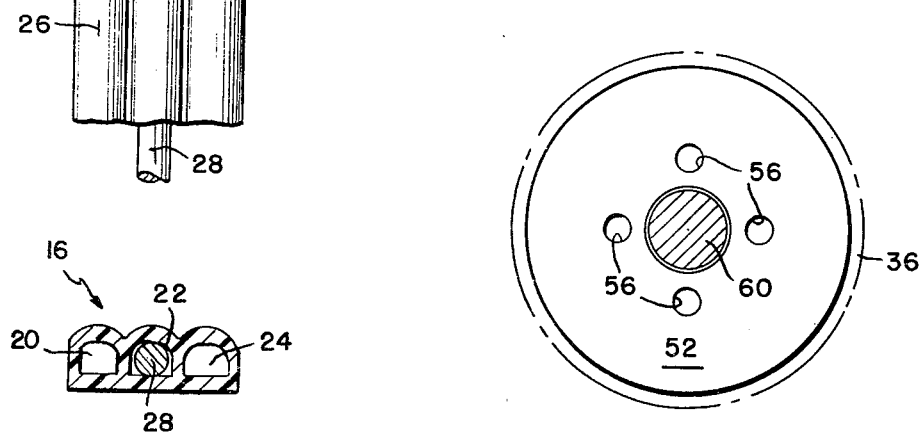

AIR TRAP

CROSS REFERENCE TO RELATED APPLICATION

This is a division of our application, Ser. No. 286,008, filed Sept. 5, 1972, now Pat. No. 3,848,623 issued Nov. 19, 1974.

BACKGROUND OF THE INVENTION

This invention relates generally to air traps and more particularly to an air trap for use with apparatus for producing air bubbles in a body of water. Bubble producing devices have been used for many purposes, such as, for example, the aeration of lakes, the de-icing of channels and marinas, the oxidation and turnover of sewage lagoons and stagnant bodies of water, and the confining of water pollutants such as oil spills floating on the surface of a body of water. In systems of this type air under pressure is bubbled out through a pattern of openings arranged along one or more elongated conductors. In a typical system the conductors are constituted by weighted flexible hose and rest on the bottom of a body of water. However, they may be submerged to and held at an intermediate depth.

In the start-up of an ideal system, air supplied by the compressor displaces water in the conductor, forcing the water out through the openings. Air is first released from the opening nearest the compressor, with openings farther away from the compressor successively releasing air until the water in the conductor is completely displaced whereupon the system is in full operation. In many such systems, however, the air finds its path of least resistance in the several openings nearest the compressor. As a result, it often takes a great deal of time for water to be displaced throughout the entire length of a conductor. In some instances an equilibrium is reached in which the air-water interface within the conductor does not move at all, in which event the start-up time is infinitely long: it is impossible to release bubbles along the entire length of the conductor. The foregoing problems are especially apt to occur in systems wherein the depth of a conduit varies along its length in such a way that openings farther away from the compressor are deeper and thus subject to greater static pressure than openings nearer the compressor.

A related problem occurs where the openings in the conduit are check valves of distendable material, e.g. slits formed in the wall of a flexible plastic hose. By the time the water is pushed out through the openings at the far end of the hose system, the openings closer to the air supply which are already releasing air may have distended themselves to a condition in which they are larger than that which would be required for normal operation of the system. This excessive enlarging of the openings is caused because these openings temporarily handle the entire capacity of the compressor during start-up. The distended openings do not always resume their former shape when air reaches the far end of the conduit. As a result, there can be a waste of air at the location near the compressor while the openings more distant from the compressor may not get their rightful supply of air for uniform operation. The uniformity of air distribution is essential to the effectiveness of the operation of air bubbling systems and the problems described above have not yet been solved in the prior art.

SUMMARY OF THE INVENTION

In accordance with the invention there is provided an air trap which allows the liquid in the conductor to be eliminated readily therefrom when air is supplied to the conductor and which prevents an excessive build-up of pressure within the system until the entire conductor is filled with gas at which time the valve closes. Since the liquid can flow readily from the conductor through the open air trap there will be no pressure build-up within the system until all the liquid is displaced with the gas and the air trap closes. Thus the gas will not pass through the bubbler openings until the liquid is removed from the conductor and will then pass out all of the openings at approximately the same time and pressure and as soon as possible. This makes for uniformity of air distribution.

Briefly stated, the air trap in accordance with the invention comprises a valve body, an inlet adapted to be connected to the internal passage of the conductor which is supplied with gas from the compressor, an outlet adapted to communicate with the exterior of the valve, an passageway means interconnecting the inlet and the outlet. There is also provided a valve constructed and arranged for opening and closing said passageway means and means connected to the valve responsive to the discharge of air from the outlet means to move said valve from an open position to a position closing said passageway means.

The means responsive to the discharge of air is a flotation device or trap which moves the valve to the closed position when air discharged through the passageway accumulates in the trap. As soon as the valve closes, it is held closed by air pressure and air is allowed to escape slowly from the trap, enabling the valve to open automatically when the air supply is shut down. The system is thus automatically made ready for the next start-up.

BRIEF DESCRIPTION OF THE DRAWINGS

FIG. 1 is an elevation of a system for producing bubbles from an elongated conductor;

FIG. 2 is a fragmentary view of a portion of the hose used in the system shown in FIG. 1;

FIG. 3 is a section taken on line 3—3 of FIG. 2;

FIG. 5 is a perspective view of a detail of the air trap shown in FIG. 4; and

FIG. 6 is a section taken on line 6—6 of FIG. 4.

DESCRIPTION OF THE PREFERRED EMBODIMENT

Figure 4:
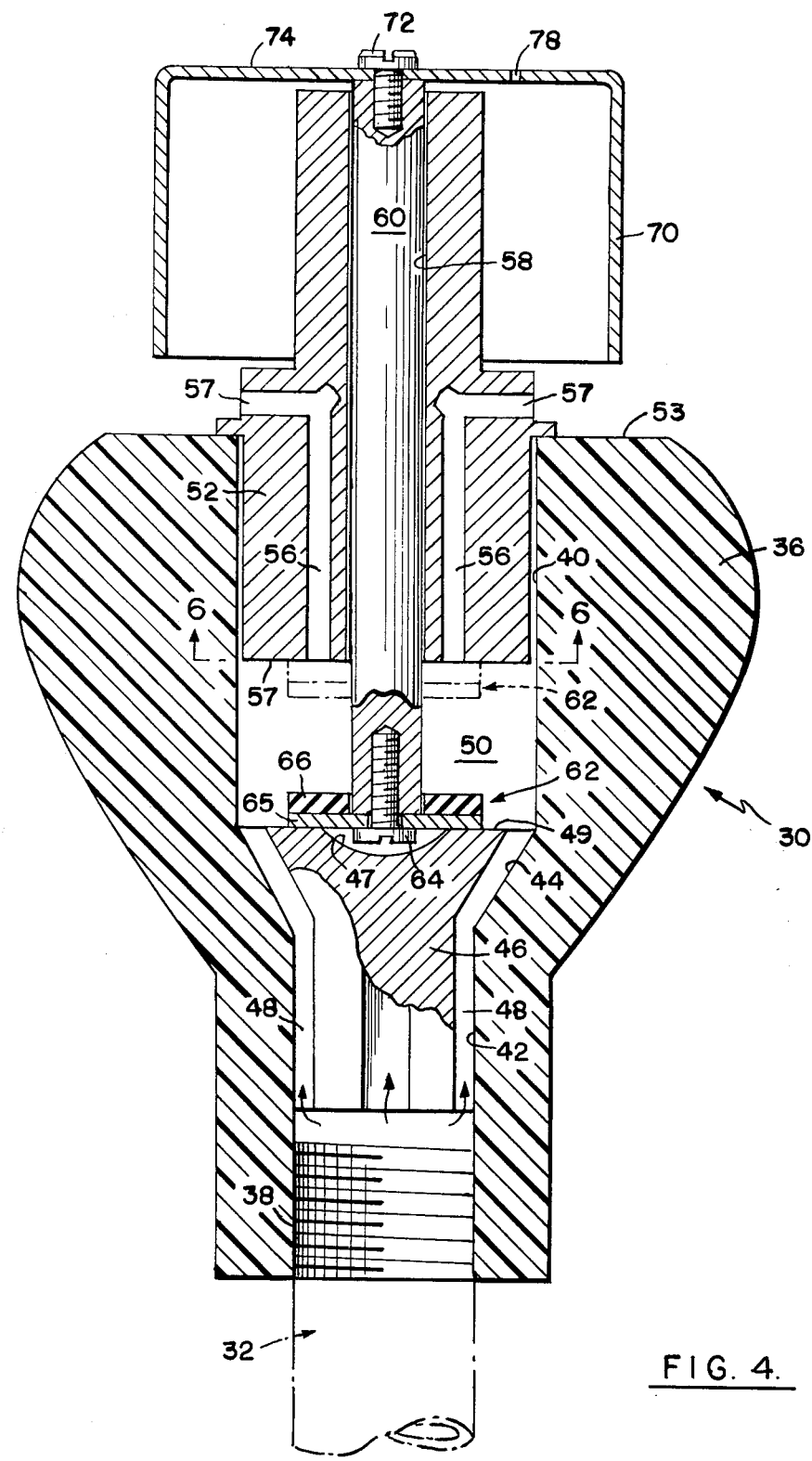
FIG. 4 is a sectional view of an air trap in accordance with the invention employed in the system shown in FIG. 1.

In FIG. 1 there is shown a system for producing air bubbles in a body of water wich includes an air compressor 10, which may be of various types although it is preferably of the reciprocating type capable of delivering the pressure required for the particular air bubbling system application involved. The high pressure outlet of the compressor 10 is connected through a conduit 12 which extends downwardly to an "L"-connector 14. The conduit 12 is preferably of sufficient length so that it can extend from the compressor, which is located on or above the surface of the body of water or on a shore point, to the connector 14 which rests on the bottom of the body of water.

A length of bubbling hose, indicated generally at 16, is connected at one end to the connector 14 and extends along the bottom of the body of water for connection at its other end to an L-connector 18. The bubbling hose is shown in detail in FIGS. 2 and 3 and is made of an elongated conductor preferably of the polyvinyl chloride type having three parallel internal passages 20, 22 and 24, although other materials and configurations may be used. The outside passages 20 and 24 are provided with openings in the form of slits 26 running lengthwise of the bubbling hose. The slits, spaced along the length of the hose, provide communication between the internal passages 20 and 24 and the outside of the hose 16 to thereby allow the escape of air from these passages to produce bubbles. The central passage 24 is preferably provided with a lead rod 28 to hold the hose 16 on the bottom of the body of water.

The slit-type openings are self-cleaning and tend to close and seal the hose when pressure is removed to prevent the entrance of sand and other matter. Alternatively, the openings can be drilled holes, machined orifices, self-closing check valves, or small inserts of porous material which allow air to pass when pressure is applied and which allow water to flow back into the bubbling hose when pressure is turned off, and which keep all but finest foreign matter from passing into the bubbling hose. The construction of the bubbling openings is well known in the art, and various forms may be used.

Also, the arrangement of the openings may be varied. For example, openings can be provided at various desired locations along the length of the hose and may be provided in the central passage 22, or in any combination of the passages, depending on the bubbling characteriestics desired.

An air trap in accordance with the invention is indicated generally at 30 and is connected at its lower inlet end to the connector 18 by way of a flexible hose 32 and a fitting 34 in the upwardly facing end of the connector 18. Referring to FIG. 4, the air trap 30 comprises a lower body portion 36 which has a threaded inlet passage 38 at its lower end adapted to be threadably engaged with the upper end of the flexible hose 32 to provide flow communication therebetween.

The body portion 36 is constructed to serve as a float to hold the air trap 30 and the flexible conduit 32 in the vertically extending position shown in FIG. 1 with the valve being approximately two feet above the hose 16 which would normally be on the bottom of the body of water. Alternatively, this vertical position may be achieved mechanically if desired. In order to achieve this floating action the body portion 36 is made of a buoyant material, such as a suitable foamed plastic, and is made of such a size to provide the necessary buoyancy to maintain the vertical position.

Body portion 36 has an axially extending opening therethrough comprising an upper cylindrical portion 40 and a lower cylindrical portion 42 joined by an intermediate conical portion 44. Positioned within cylindrical portion 42 and conical portion 44 is a diverter member 46 having a conical portion and a cylindrical portion conforming to opposed corresponding portions 42 and 44. The diverter member 46 is provided with four circumferentially equally spaced grooves extending along the periphery thereof from one end to the other, these grooves cooperating with the adjacent portions 42 and 44 of body portion 36 to define four flow passages 48 extending from inlet 38 to a chamber 50 above the diverter member 46. It will be noted that the passages 48 communicate with chamber 50 at peripheral locations on member 46.

An upper body portion 52 is arranged to rest on the upper end 53 of lower body portion 36 at an annular rim 54 and to extend within the cylindrical portion 40. Body portion 52 is provided with four circumferentially equally spaced flow passages 56 each of which consists of an axially extending portion and a laterally extending discharge portion forming at their ends the outlet ports 57 for the air trap 30. It will be apparent that the flow passages 48, the chamber 50 and the flow passages 56 form a passageway means between the inlet 38 and the outlet ports 57 of the air trap 30.

Slidably mounted within an axial bore 58 in body portion 52 is an axially extending valve stem 60. The lower end of valve stem 60 extends into chamber 50 and has mounted thereon a valve member 62. The valve member 62 is mounted on the valve stem 60 by means of a mounting screw 64 and consists of a steel washer 65 having a resilient washer 66 cemented to the upper face thereof. As will be described hereafter, the valve stem 60 is slidable upwardly within bore 58 to position the valve 62 in the dotted line position shown in FIG. 4 in which position the washer 66 engages the lower end 67 of body member 52, this lower end 67 serving as a valve seat with which the valve member 62 cooperates. When the valve member 62 is moved to the dotted line position, it closes off the lower end of passages 56 to thereby close off flow through the air trap 30 as will be described hereafter.

Means are provided for moving the valve member 62 between the solid and dash line positions shown in FIG. 4. To this end, there is provided an inverted cup 70 which is mounted on the upper end of the valve stem 60 by means of a mounting screw 72 which engages the base 74 of the cup and holds the same on the upper end of the valve stem 60 as is shown in FIG. 4. The cup 70 is open at its lower end and has its side wall portion 76 located so as to surround the outlet ports 57 of flow passages 56. The base 74 of cup 70 is provided with a small restricted orifice 78 which serves as a bleed passage for air as will be described hereafter.

The upper end 49 of diverter member 46 serves to support the valve member 62, the valve stem 60 and cup 70 in the solid line position and to limit the downward movement thereof. A recess 47 is formed in the upper end 49 of member 46 to provide clearance between screw 64 and member 46 in the solid line position.

In the operation of the bubbling system shown in FIG. 1, at start-up the internal passages of the bubbling hose 16, the flexible hose 32 and the air trap 30 will be filled with water since when no air is present in these internal passages, water can pass therein by way of the openings 26 and by way of the open air trap passages. The air trap 30 will be in the position shown in solid lines in FIG. 2 allowing water to pass through passages 56, chamber 50 and passages 48 into the flexible tube 32. It will be noted that in this condition the air trap 30 will allow water to flow out of the bubbling hose freely as air is applied to the supply end of the hose 16. Thus, when the compressor 10 is operated to supply air under pressure to the end of the hose 16 attached to connector 14, the water in the passages of the bubbling hose 16 is pushed out of the hose through connector 18, flexible hose 32 and the open passageway means in the air trap. Thus, water flows freely through the air trap by way of the inlet 38, flow passages 48, chamber 50 and flow passages 56 and is discharged from the air trap from outlet ports 57 in the region below the open end of the inverted cup 70. As the water flows upwardly through flow passages 48 into chamber 50 it will be diverted around the valve member 62 by these passages 48. When all the water is pushed out from the bubbling hose 16, air begins to pass through the abovedescribed passageway means in the air trap 30. As the air is discharged from the outlet ports 57 at the end of passages 56, it will flow upwardly into the interior of the inverted cup 70 which serves as a trap means to hold this air. The air trapped in the cup member 70 will displace the water therein to thereby give enough buoyancy to the cup 70 to cause the cup 70 to move upwardly along with the valve stem 60 and the valve member 62 mounted thereon. The valve member 62 will then move upwardly to the dotted line position shown in FIG. 4 and close the lower end of passages 56 preventing any further flow of air through the air trap 30. The valve member 62 is then held in this closed position by the pressure that is applied against the lower face of the valve member 62 by the air pressure in the system. The air will then be forced through the bubbler slits 26.

By reason of the fact that the air trap 30 was open at the beginning of the application of air to the system and provided for the ready escape of water from the system, the air will be applied uniformly to all of the bubbler openings at approximately the same pressure and time. Moreover, this will occur as soon as possible with very little loss of air.

When the system is shut off, water will come back into the bubbling hose by way of the air openings. The water will also come back into the system by way of the air trap which will return to the open position once the air pressure is removed from the underside of the valve member. When this occurs, the valve stem and cup and valve 62 mounted thereon will return by reason of their own weight, it being noted that any air previously trapped in the cup member will have been bled therefrom by way of the bleed passage 78. The valve is now in a position to provide for the ready elimination of water from the system the next time air is applied thereto. The above procedure will be repeated for each starting run and stop cycle of the system.

It will be noted that the arrangement whereby the body portion 36 achieves a floating action to position the air trap above the bottom of the body of water serves to keep the valve free from mud and other particles that could cause difficulty if they would pass into the valve when the air is shut off.

It will also be noted that while the system is described as having been positioned on the bottom of the body of water it might be held in an intermediate position between the surface and the bottom by suitable devices such as anchors or floats. Where these are used, however, it may be necessary to insure that the assembly remains in a rigid condition so that parts do not sag in the water when they become filled with water.

It will also be evident that the air trap may be located at positions other than the end of the system. For example, the air trap might be located at a low point in the system where water might be trapped or at a far point in a loop so that the water, as it is pushed by the air, will have an easy point of escape from the system.

It will be apparent that various other modifications may be made in the arrangement in accordance with the invention wherefore it is not desired to be limited except as required by the following claims.

We claim:

1. A system for producing gas bubbles in a body of liquid comprising:
    means for supplying a gas under pressure;
    a submersible elongated conductor having an internal passage connected to receive gas from said supplying means, and a plurality of openings along its length for allowing said gas to flow outwardly from said internal passage to produce bubbles in a body of liquid;
    means providing an additional opening for effecting rapid removal of accumulated liquid from said internal passage by displacement with gas;
    means for sensing the completion of removal of said accumulated liquid and means responsive to said sensing means for automatically closing said additional opening when the displacement of said accumulated liquid has been completed, thereby causing said gas to escape through said plurality of openings; and means responsive to the pressure of gas within said internal passage for maintaining said opening in its closed condition so long as said pressure is maintained.

2. A system according to claim 1 in which the means providing an additional opening is located at a location remote from the location of the connection between the internal passage and the supplying means.

3. A system according to claim 1 wherein said sensing means is responsive to the escape of the gas from said additional opening.

4. A system according to claim 1 wherein said sensing means includes a trap means surrounding the discharge region of said additional opening so as to trap gas discharged therefrom, and wherein said means responsive to said sensing means includes valve means arranged to close said additional opening, and means interconnecting said trap means and said valve means whereby, as gas is trapped in said trap means, the trap means, and the valve means move upwardly to effect closure of said opening by said valve means.

5. A system according to claim 1 in which the means providing an additional opening is located at a location remote from the location of the connection between the internal passage and the supplying means, and wherein said sensing means is responsive to the escape of gas from said additional opening.

* * * * *